Figure 2:

C. ADAMS.
INSERTABLE-SAW-TEETH.

No. 177,446.　　　　　　　　　　Patented May 16, 1876.

Attest:
Chas Thurman
R. N. Dyer

Inventor:
Calvin Adams
by Geo. W. Dyer
Atty.

UNITED STATES PATENT OFFICE.

CALVIN ADAMS, OF RUSSELLSBURG, PENNSYLVANIA.

IMPROVEMENT IN INSERTIBLE SAW-TEETH.

Specification forming part of Letters Patent No. 177,446, dated May 16, 1876; application filed December 7, 1875.

*To all whom it may concern:*

Be it known that I, CALVIN ADAMS, of Russellsburg, in the county of Warren and State of Pennsylvania, have invented a new and useful Improvement in Insertible Saw-Teeth; and I do hereby declare that the following is a full and exact description of the same, reference being had to the accompanying drawings and to the letters of reference marked thereon.

The object I have in view is an improvement in saw-teeth adapted for convenient insertion and removal from the saw-plate for the purpose of making such teeth more efficient, durable, and convenient in use; and my invention therein consists in the peculiar form of the tooth, which adapts it to have specially the advantages before named.

In order to enable those skilled in the art to make and use my tooth, I now proceed to describe the same, having reference to the drawing, making a part of this specification, in which—

Figure 3:
Figure 1:
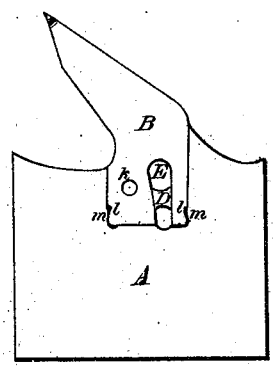

Figure 1 is a side view of my saw-tooth in a portion of a saw-plate; Fig. 2, a front view of the said tooth; Fig. 3, a top view of the same.

Like letters denote corresponding parts in each figure.

In the drawings, A represents the saw-plate of any ordinary construction; B, the saw-tooth; C, the recess in the saw-plate, and D the key, which fastens the tooth in position. The said tooth, which is a hook-tooth, has the upper and under edges $a$ and $b$ rounded as far as the cutting-faces hereinafter described. The upper cutting-face $c$ extends in about the same line of direction as the edge $a$, but gradually widens out to a point, $d$, and from that point to the extreme end $e$ flares more rapidly, as shown in Fig. 3. Through this face $c$ a groove, $f$, extends to the extreme end $e$ of the tooth. The under cutting-face $g$ is hollowed out a little from the upper end of the edge $b$ to the extreme end $e$ of the tooth. The body of the tooth is grooved on both sides, $h$ and $h'$, in order to hold more firmly in the recess C, in said plate, whose corresponding edges are beveled accordingly, and is inserted and driven down in place therein. At the lower corners $i$ and $i'$ of the recess the same is cut out in semicircular form to prevent the saw from cracking in such corners. In the body of the tooth is formed the radial slot E, extending from a point near its center to the outer edge of said tooth. The upper and lower edges of the slot E are beveled to agree with corresponding grooves in the key D. This key, of the same thickness of the saw-plate, is inserted in the tooth before the tooth is inserted in the saw-plate, and the act of driving in the tooth causes the slot E to be tapered a little toward the edge of the saw. An opening, $k$, in the tooth serves to admit any proper tool or punch to assist in backing out the tooth. To place the tooth in position, the key being in place in the slot with a small space near its inner end $j$, the tooth is driven into the recess by inserting a proper punch into the inner end $j$ of the slot E, and by blows upon the punch the tooth is forced down into the recess. By then striking upon the side of the punch the key D is driven outwardly in the slot E toward the edge of the tooth sufficiently to hold the same firmly in position.

In the tooth shown in Fig. 4 the slot E is vertically arranged, and runs to the bottom of the tooth; and to assist, further, in holding the tooth in position there are notches $l$ on either side of the tooth near its bottom to engage with corresponding projections $m$ in the saw-plate.

The particular advantage connected with this construction of saw-tooth results from the fact that this key is always held in place in the body of the tooth, and when the tooth is removed for any purpose there is no danger of the same being lost or mislaid. When the key is forced into position to hold the tooth it is driven from near the center of the tooth toward the outside near its bottom, thereby bringing the expansion of the tooth at the proper place—that is to say, near its bottom, but confining its expansion to the tooth alone, and bringing no especial strain on the saw-plate, as is the case with keys inserted in the saw-plate, or partly in the plate and partly in the tooth. Moreover, as it is requisite in an inserted tooth that it shall cut with the least possible resistance or friction, the peculiar shape of the cutting-faces, one being grooved with strong flanged cutting-lips and the other hollowed out, tends greatly to this result.

Having thus described my saw-tooth, its manner of use, and some of its advantages, what I claim as new therein, and desire to secure by Letters Patent, is—

The saw-tooth B, constructed with the slot E, extending radially from a point near the center of the tooth to the outer edge thereof, and adapted for a locking-key to be retained in the tooth, and driven outwardly, substantially as described.

This specification signed and witnessed this 6th day of December, 1875.

CALVIN ADAMS.

Witnesses:
CHAS. THURMAN,
R. N. DYER.